United States Patent
Goodman et al.

(10) Patent No.: US 7,743,375 B2
(45) Date of Patent: Jun. 22, 2010

(54) INFORMATION HANDLING SYSTEM INCLUDING DYNAMICALLY MERGED PHYSICAL PARTITIONS

(75) Inventors: Benjiman Lee Goodman, Cedar Park, TX (US); Milton Devon Miller, II, Austin, TX (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 12/163,206

(22) Filed: Jun. 27, 2008

(65) Prior Publication Data

US 2009/0327643 A1 Dec. 31, 2009

(51) Int. Cl.
G06F 9/455 (2006.01)
G06F 3/00 (2006.01)
G06F 12/00 (2006.01)
G06F 15/167 (2006.01)

(52) U.S. Cl. .......................... 718/1; 711/141; 711/173; 710/8; 709/215

(58) Field of Classification Search .................. 718/1; 710/8; 711/141, 173; 709/215
See application file for complete search history.

(56) References Cited

U.S. PATENT DOCUMENTS

| 5,574,914 | A | 11/1996 | Hancock et al. |
| 5,659,786 | A | 8/1997 | George |
| 5,692,121 | A | 11/1997 | Bozso |
| 5,931,938 | A | 8/1999 | Drogichen et al. |
| 6,185,666 | B1 * | 2/2001 | Murray et al. ............... 711/173 |
| 6,260,068 | B1 | 7/2001 | Zalewski |
| 6,543,002 | B1 | 4/2003 | Kahle |
| 6,883,065 | B1 | 4/2005 | Pittelkow |
| 6,910,108 | B2 * | 6/2005 | Downer et al. ............... 711/141 |
| 6,990,545 | B2 | 1/2006 | Arimilli et al. |
| 7,167,970 | B2 | 1/2007 | Jacobson |
| 7,194,581 | B2 | 3/2007 | Vogt |
| 7,219,343 | B2 * | 5/2007 | Almeida et al. ............. 717/172 |
| 7,313,637 | B2 * | 12/2007 | Tanaka et al. .................. 710/8 |

(Continued)

FOREIGN PATENT DOCUMENTS

JP 10-228458 8/1998

(Continued)

OTHER PUBLICATIONS

Extended European Search Report dated Apr. 27, 2009.

(Continued)

*Primary Examiner*—Lewis A Bullock, Jr.
*Assistant Examiner*—Jennifer N To
(74) *Attorney, Agent, or Firm*—Mark P. Kahler; Shimokaji & Associates, P.C.

(57) ABSTRACT

An information handling system includes instruction processing nodes in respective physical partitions. A communications bus couples two information processing nodes together. Each node includes hardware resources such as CPUs, memories and I/O adapters. Prior to a command to merge the physical partitions, the communication bus exhibits a disabled state such that the two information processing nodes are effectively disconnected. After receiving a command to merge the physical partitions, the system enables the communication bus to effectively hot-plug the two nodes together. A modified master hypervisor in one node stores data structures detailing the hardware resources of the two nodes. The modified master may assign resources from one node to a logical partition in another node.

9 Claims, 6 Drawing Sheets

U.S. PATENT DOCUMENTS

| | | | |
|---|---|---|---|
| 2003/0131214 | A1 | 7/2003 | Downer et al. |
| 2004/0181647 | A1 | 9/2004 | DeSota et al. |
| 2004/0267894 | A1 | 12/2004 | Zaharias |
| 2005/0021913 | A1 | 1/2005 | Heller, Jr. |
| 2005/0154869 | A1 | 7/2005 | Shaw et al. |
| 2006/0010450 | A1 | 1/2006 | Culter |
| 2006/0136929 | A1* | 6/2006 | Miller et al. ................ 718/105 |
| 2006/0179207 | A1 | 8/2006 | Eisen |
| 2006/0187818 | A1 | 8/2006 | Fields, Jr. |
| 2007/0124274 | A1* | 5/2007 | Barsness et al. ................ 707/2 |
| 2007/0143315 | A1 | 6/2007 | Stone |
| 2008/0215702 | A1* | 9/2008 | Zaharias .................... 709/215 |

FOREIGN PATENT DOCUMENTS

| | | |
|---|---|---|
| JP | 10-240707 | 9/1998 |
| JP | 2000-172655 | 6/2000 |
| JP | 2000 235554 | 8/2000 |
| JP | 2001-155004 | 6/2001 |
| JP | 2006-024214 | 1/2006 |
| JP | 2006-216068 | 8/2006 |

OTHER PUBLICATIONS

CAI—"Server Consolidation Using Advanced POWER Virtualization and Linux", IBM White Paper (Oct. 24, 2006).

DB2—"Database Partition and Processor Environments", downloaded from http://publib.boulder.ibm.com/infocenter/db2luw on Feb. 17, 2008.

Hoffman—"Configuring p690 in an IBM eServer Cluster 1600", IBM Redpaper (Jun. 2002).

Intel—"Enhanced Virtualization on Intel® Architecture-based Servers", Intel White Paper (© 2006).

Oshins—"Device Virtualization Architecture"—Microsoft, WinHEC (2006).

Quintero—"IBM eServer pSeries Cluster Systems Handbook"—IBM (Oct. 2003).

Scott—"The Virtues of Virtualization"—Virtual Strategy Magazine (© 2008).

Shiveley—"Consolidation Strategies for Intel® Processor-based Servers", Technology@Intel Magazine (Mar. 2006).

Siegel—"Logical partition mode physical resource management on the IBM eServer z990", IBM J. Res. & Dev. vol. 48 No. 3/4 May/Jul. 2004.

Skeleton—"Configuring SUSE Linux on POWER5 to maximize performance", downloaded from http://www.ibm.com/developerworks/systems/library/es-power5virtualization/index.html on Feb. 19, 2008.

Uhlig—"Intel Virtualization Technology", IEEE Computer Society (May 2005).

VMWare—"VMWare Server—Free Virtualization for Windows and Linux Servers", (© 1998-2007).

JP Office Action dated Jul. 23, 2009.

* cited by examiner

BEFORE PHYSICAL PARTITION MERGER

FIG. 4

AFTER PHYSICAL PARTITION MERGER

INFORMATION HANDLING SYSTEM INCLUDING DYNAMICALLY MERGED PHYSICAL PARTITIONS

BACKGROUND

The disclosures herein relate generally to information handling systems, and more specifically, to information handling systems that employ multiple processors.

Modern information handling systems (IHSs) frequently use multiple processors to handle the heavy workloads of today's complex and feature-rich application software. Contemporary IHSs may in fact handle several applications at the same time.

An IHS may include hardware resources such as multiple processors or central processing units (CPUs), multiple memories and multiple I/O adapters. The IHS may employ a hypervisor to allocate these CPU, memory and I/O hardware resources to a number of different logical partitions (LPARs). The hypervisor is a software abstraction layer between the hardware resources and the logical partitions. Each logical partition will execute or run a unique operating system that may only access to the resources that the hypervisor defines for that particular logical partition. Each operating system may execute multiple software applications. In this manner, the modern IHS may handle the heavy workload of several different software applications at the same time.

BRIEF SUMMARY

Accordingly, in one embodiment, a method is disclosed for operating an information handling system (IHS). The method includes providing first and second nodes that are physically partitioned from one another, the first and second nodes being in a pre-merger state. The method also includes configuring the first node to operate in a first predetermined address range while the first node exhibits the pre-merger state. The method further includes configuring the second node to operate in a second predetermined address range that is non-overlapping with respect to the first predetermined address range while the second node exhibits the pre-merger state. The method still further includes activating, in response to a merge command, a communication bus between the first and second nodes to merge the first and second nodes to form a merged physical partition in a post-merger state. The first node may communicate over the communication bus with the second node via the second predetermined address range of the second node. The second node may communicate over the communication bus with the first node via the first predetermined address range of the first node.

In another embodiment, an information handling system (IHS) is disclosed. The IHS includes first and second nodes that are physically partitioned from one another, the first and second nodes being in a pre-merger state, wherein the first node is operative in a first predetermined address range and the second node is operative in a second predetermined address range that is non-overlapping with respect to the first predetermined address range. The IHS also includes a communication bus situated between the first and second nodes, the communication bus being logically disabled during the pre-merger state, the communication bus responding to a merge command to merge the first and second nodes to form a merged physical partition in a post-merger state wherein the first node may communicate over the communication bus with the second node via the second predetermined address range of the second node, and further wherein the second node may communicate over the communication bus with the first node via the first predetermined address range of the first node.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1:
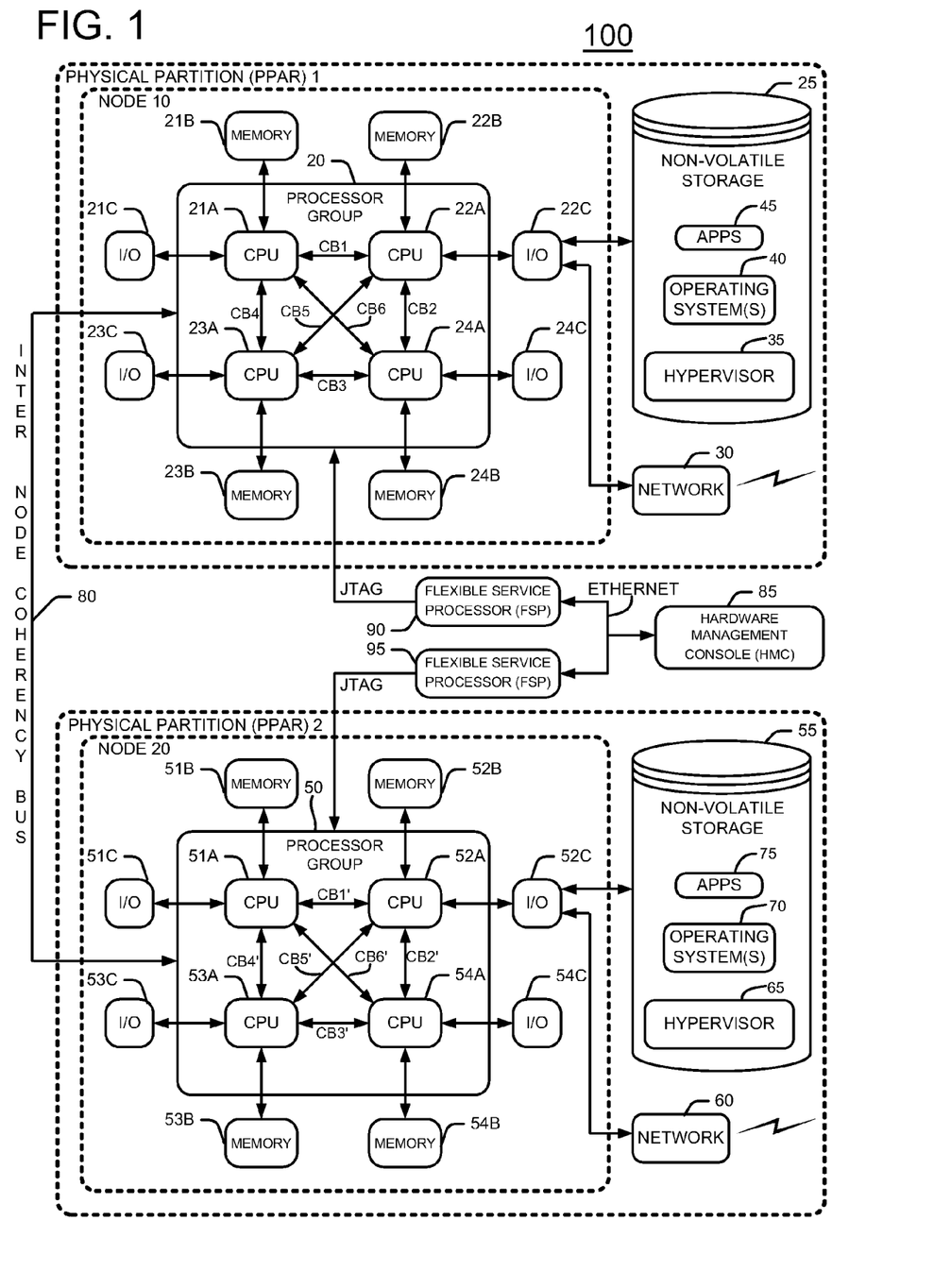
FIG. 1 shows a block diagram the disclosed multi-node symmetric multi-processor (SMP) information handling system (IHS) in a pre-merged state.

FIG. 1 shows an information handling system (IHS) 100 that includes information processing nodes 10 and 20. Nodes 10 and 20 are physically separate or physically partitioned from one another. FIG. 1 shows node 10 within a physical partition 1 and further shows node 20 within a physical partition 2. Nodes 10 and 20 include hardware resources such as multiple processors or CPUs, multiple memories and multiple I/O adapters, as described in more detail below. At some point in time that a user or other entity determines, node 10 of physical partition 1 and 20 of physical partition 2 may merge into a merged partition, as described in more detail below. In the embodiment of FIG. 1, physical partitions 1 and 2 may merge to form the merged partition. A partition may include multiple nodes.

Node 10 of physical partition 1 includes a processor group 20 with processors or CPUs 21A, 22A, 23A and 24A. Internal coherency busses CB1, CB2, CB3, CB4, CB5 and CB6 couple CPUs 21A, 22A, 23A and 24A together within processor group 20 to enable these CPUs or processors to communicate with one another. CPUs 21A, 22A, 23A and 24A couple respectively to memories 21B, 22B, 23B and 24B. CPUs 21A, 22A, 23A and 24A also couple respectively to I/O adapters 21C, 22C, 23C and 24C. One or more of the I/O adapters, such as I/O adapter 22C, couples to non-volatile storage 25 and a network adapter 30. Network adapter 30 enables node 10 to connect by wire or wirelessly to a network and other information handling systems. In one embodiment, a designer may configure processors 21A-24A in a symmetric multiprocessor (SMP) arrangement such that each processor or CPU may access any of memories 21B-24B and any of I/O adapters 21C-24C.

Nonvolatile storage 25 may provide storage for software such as a hypervisor 35, operating systems 40 and software applications (APPS) 45. Within node 10 of physical partition 1, hypervisor 35 provides a hardware abstraction layer between one or more logical partitions (not shown) and hardware resources such as CPUs 21A-24A, memories 21B-24B and I/O adapters 21C-24C. The same or different operating system 40 may operate on each logical partition. One or more software applications (APPS) 45 execute on each operating system 40 to provide node 10 with a workload to process.

Node 20 of partition 2 includes a processor group 50 with processors or CPUs 51A, 52A, 53A and 54A. Internal coherency busses CB1', CB2', CB3', CB4', CB5' and CB6' couple CPUs 51A, 52A, 53A and 24A together within processor group 20 to enable these CPUs or processors to communicate with one another. CPUs 51A, 52A, 53A and 54A couple respectively to memories 51B, 52B, 53B and 54B. CPUs 51A, 52A, 53A and 54A also couple respectively to I/O adapters 51C, 52C, 53C and 54C. One or more of the I/O adapters, such as I/O adapter 52C couples to non-volatile storage 55 and a network adapter 60. Network adapter 60 enables node 20 to connect by wire or wirelessly to a network and other information handling systems. In one embodiment, the designer may configure processors 51A-54A in a symmetric multiprocessor (SMP) arrangement such that each processor may access any of memories 51B-54B and any of I/O adapters 51C-54C.

In a manner similar to nonvolatile storage 25 discussed above with respect to node 10, the nonvolatile storage 55 of node 2 may provide storage for software such as a hypervisor 65, operating systems 70 and software applications (APPS) 75. Within node 20 of physical partition 2, hypervisor 65 provides a hardware abstraction layer between one or more logical partitions (not shown) and hardware resources such as CPUs 51A-54A, memories 51B-54B and I/O adapters 51C-54C. The same or different operating system 70 may operate on each logical partition. One or more software applications (APPS) 75 execute on each operating system 70 to provide node 20 with a workload to process.

IHS 100 also includes an inter-node coherency bus 80, namely a communication bus that couples between node 10 of partition 1 and node 20 of partition 2. Prior to the merger of physical partitions 10 and 20, system 100 maintains coherency bus 80 in a disabled state such that partition 1 and partition 2 are effectively physically separate partitions. However, when IHS 100 receives an instruction or command to merge node 10 of physical partition 1 and node 20 of physical partition 2, coherency bus 80 changes to an enabled stated to merge the 2 physical partitions, as described below in more detail.

IHS 100 also includes a hardware management console (HMC) 85 which a user may operate to initiate a physical merger operation. HMC 85 couples to nodes 10 and 20 via respective flexible service processors (FSPs) 90 and 95. In one embodiment, a user or other entity may employ HMC 85 to commence a physical merger operation of nodes 10 and 20 without first powering down nodes 10 and 20. In other words, IHS performs this merger operation dynamically without significantly disturbing applications and operating systems that execute within nodes 10 and 20.

Figure 2:
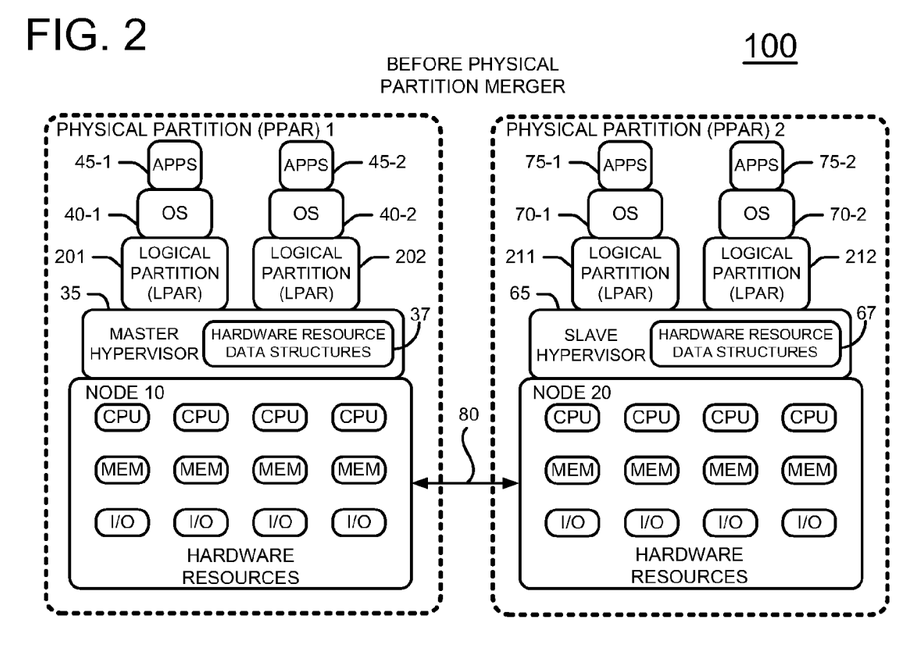
FIG. 2 is a representation of software layers of the IHS of FIG. 1 in the pre-merged state.

FIG. 2 shows a representation of the hardware resources and software layers of physical partition 1 and physical partition 2 of IHS 100 prior to a merger of physical partition 1 and physical partition 2. Nodes 10 and 20 include hardware resources such as multiple CPUs, multiple memories (MEM) and multiple I/O adapters (I/O) in a manner similar to FIG. 1. However, due to space limitations, FIG. 1 does not label these hardware resources with component numbers. IHS 100 includes a master hypervisor software layer 35 between the hardware resources of node 10 and logical partitions (LPARs) 201 and 202. Master hypervisor 35 includes hardware resource allocation data structures 37 that store information designating the particular hardware resources of node 10 (CPUs, memories and I/O) that IHS 100 allocates to each of logical partitions 201 and 202 of physical partition 1. An operating system 40-1 communicates with logical partition 201 and an operating system 40-2 communicates with logical partition 202. The operating systems on logical partitions 201 and 202 may be different operating systems or copies of the same operating system. Multiple applications (APPS) 45-1 may execute on operating system 40-1 while multiple applications (APPS) 45-2 execute on operating system 40-2.

IHS 100 also includes a slave hypervisor software layer 65 between the hardware resources of node 20 and logical partitions (LPARs) 211 and 212. Slave hypervisor 65 includes hardware resource allocation data structures 67 that store information designating the particular hardware resources of node 20 (CPUs, memories and I/O) that IHS 100 allocates to each of logical partitions 211 and 212 of physical partition 2. An operating system 70-1 communicates with logical partition 211 and an operating system 70-2 communicates with logical partition 212. The operating systems on logical partitions 201 and 202 may be different operating systems or copies of the same operating system. Multiple applications (APPS) 75-1 may execute on operating system 70-1 while multiple applications (APPS) 75-2 execute on operating system 70-2.

The pre-merger state refers to IHS 100 prior to the merger of node 10 of physical partition 1 and node 20 of physical partition 2. The post-merger state refers to IHS 100 after the merger of node 10 of physical partition 1 and node 20 of physical partition 2. During the pre-merger state, IHS 100 maintains coherency bus 80 in a disabled mode such that node 10 of partition 1 and node 20 of partition are physically separate. In other words, node 10 and node 20 are effectively different computer systems that operate as standalone systems although they may include coherency bus 80.

Figure 3:
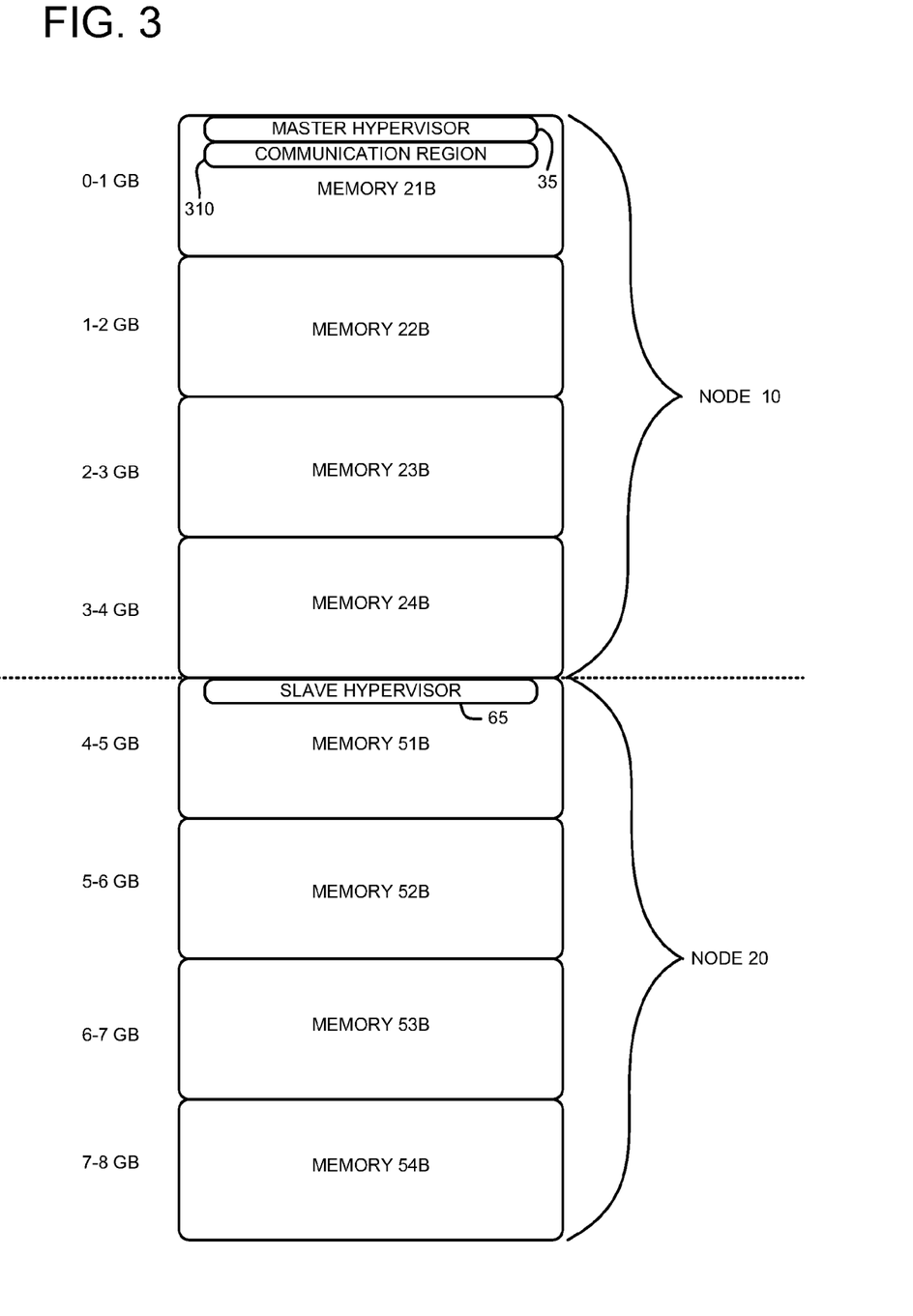
FIG. 3 is a memory map of the disclosed IHS in both the pre-merged state and the post-merged state.

FIG. 3 shows an address memory map to demonstrate that IHS 100 assigns non-overlapping address ranges to the memories of node 10 and the memories of node 20 during the pre-merger state. In other words, prior to the merger of node 10 and node 20, the memories of nodes 10 and 20 exhibit non-overlapping or disjoint address ranges. More specifically, memories 21B, 22B, 23B and 24B of node 10 exhibit address ranges of 0-1 GB, 1-2 GB, 2-3 GB and 3-4 GB, respectively. Memories 51B, 52B, 53B and 54B of node 20 exhibit address ranges of 4-5 GB, 5-6 GB, 6-7 GB and 7-8 GB, respectively. Stated alternatively, system-wide each memory exhibits a dedicated address range prior to the physical merger of node 10 of partition 1 and node 20 of partition 2. To avoid memory conflicts, IHS 100 employs these same dedicated memory ranges for its respective memories after the merger of node 10 and 20 that IHS 100 employed prior to the merger of nodes 10 and 20. After the physical partition merger, each of memories 21B, 22B, 23B, 24B, 51B, 52B, 53B and 54B still exhibits its own unique address space as it did prior to the merger. FSP 90 sets up the CPUs in physical partition 1 to boot from memory 21B, 22B, 23B and 24B. FSP 95 sets up the CPUs in physical partition 2 to boot from memory 51B, 52B, 53B and 54B.

Figure 4:
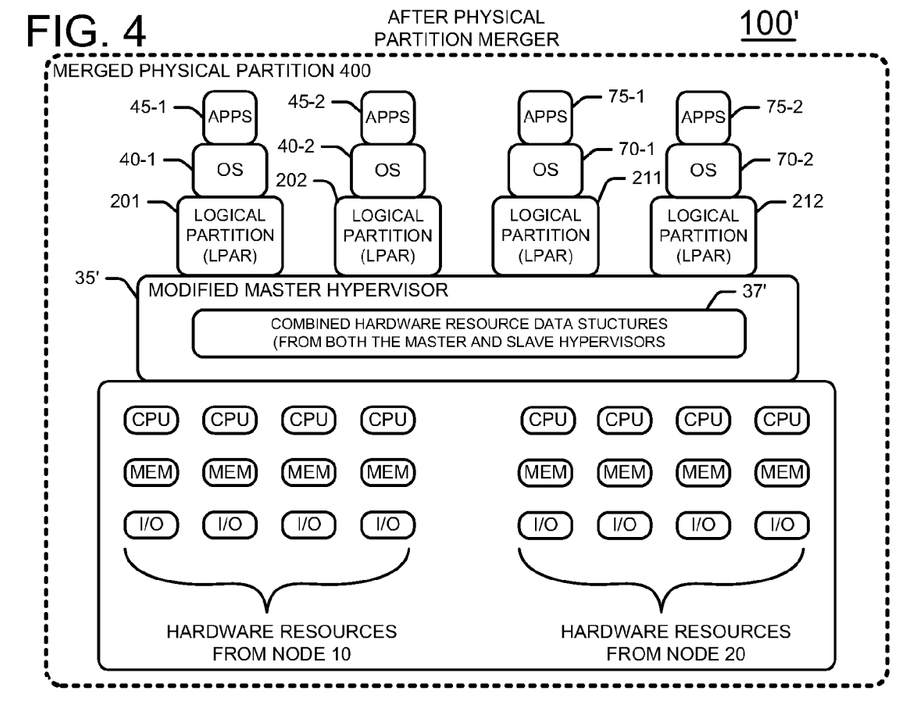
FIG. 4 is a representation of software layers of the IHS of FIG. 1 in the post-merged state.

FIG. 4 is a representation of IHS 100', namely IHS 100 after the merger of node 10 of physical partition 1 and node 20 of physical partition 2. FIG. 4 depicts a modified master hypervisor 35' between all node hardware resources and multiple logical partitions 201, 202, 211 and 212. Modified master hypervisor 35' includes combined hardware resource data structures 37' containing not only the hardware resource data structures 37 of master hypervisor 35, but also the hardware resource data structures 67 of slave hypervisor 65. Modified master hypervisor 35' maintains the CPU, memory and I/O allocations that existed prior to the physical merger. In other words, modified master hypervisor 35' allocates or assigns each logical partition to the same hardware resources that the logical partition employed before the physical merger, as described in more detail below. Operating systems 40-1, 40-2, 70-1 and 70-2 are unaware of the physical merger of nodes 10 and 20. Likewise, applications (APPS) 45-1, 45-2, 75-1 and 75-2 are unaware of the physical merger of nodes 10 and 20.

In the course of merging physical partition 1 and physical partition 2, IHS 100 effectively merges two hypervisors into one controlling hypervisor 35' that controls the hardware resources of the merged physical partition. More specifically, IHS 100 merges master hypervisor 35 and slave hypervisor 70 into an enhanced or modified master hypervisor 35' that controls allocation of hardware resources in the resultant merged partition 400 of IHS 100'. In other words, modified master hypervisor 35' now controls allocation of the hardware resources of both of the previously existing nodes 10 and 20 to logical partitions from both nodes, namely logical partitions 201, 202, 211 and 212.

Figure 5:
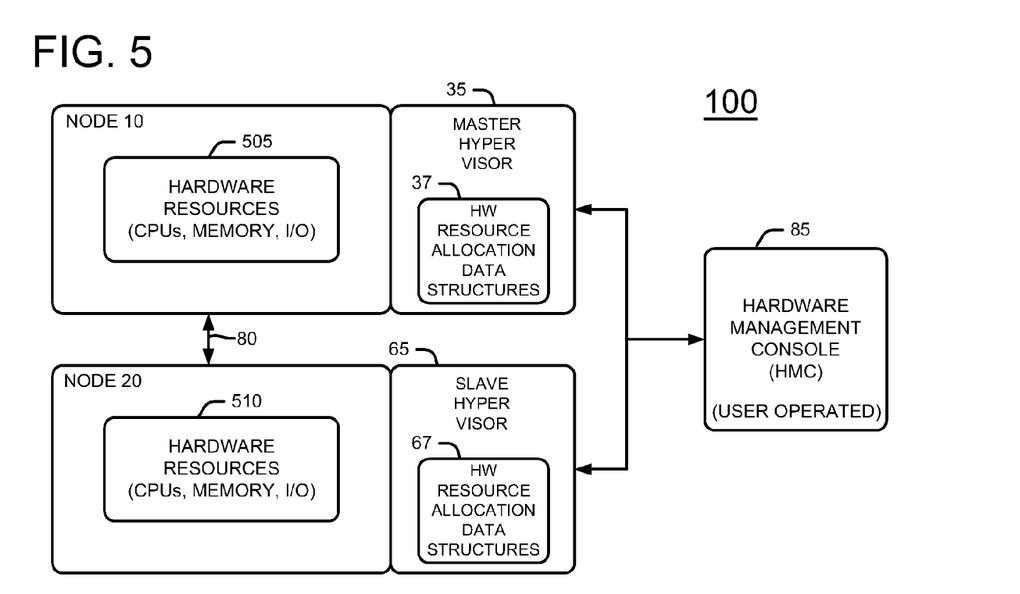
FIG. 5 is a simplified representation of the IHS in the pre-merged state wherein the data processing nodes operate as standalone machines in separate partitions with respective hypervisors.

FIG. 5 shows a simplified representation of IHS 100 prior to the merger of node 10 of partition 1 and node 20 of partition 2. In this pre-merger state, nodes 10 and 20 run essentially as standalone machines. Coherency bus 80 exhibits the disabled state prior to physical merger. In other words, with coherency bus 80 disabled, nodes 10 and 20 are separate from one another and operate as separate machines. Prior to the physical merger of nodes 10 and 20, master hypervisor 35 includes data structures 37 that contain information designating the particular hardware resources (CPUs, memories and I/O) that IHS 100 assigns or allocates to each of logical partitions 201 and 202 of physical partition 1. However, master hypervisor 35 is unaware of node 20 and slave hypervisor 65. Data structures 37 may be in the form of a look-up table (TABLE 1 below) that, for each logical partition, specifies a logical partition, one or more CPUs, memories and I/O adapters.

TABLE 1

| Logical Partition | CPUs | Memories | I/O |
| --- | --- | --- | --- |
| 201 | 21A, 22A, 23A | 21B, 22B | 22C |
| 202 | 24A | 23B, 24B | 21C, 23C, 24C |

FIG. 5 shows the hardware resources of node 10 collectively as hardware resources 505. Prior to the merger of nodes 10 and 20, slave hypervisor 65 includes data structures 67 that contain information designating the particular hardware resources (CPUs, memories and I/O) that IHS 100 assigns or allocates to each of logical partitions 211 and 212 of physical partition 2. Slave hypervisor 65 is unaware of node 10 and master hypervisor 35. Data structures 67 may be in the form of a look-up table (TABLE 2 below) that, for each logical partition, specifies one or more CPUs, memories and I/O adapters in physical partition 2.

TABLE 2

| Logical Partition | CPUs | Memories | I/O |
| --- | --- | --- | --- |
| 211 | 51A, 52A | 51B, 52B, 53B | 52C, 54C |
| 212 | 53A | 54B | 51C |

Figure 6:
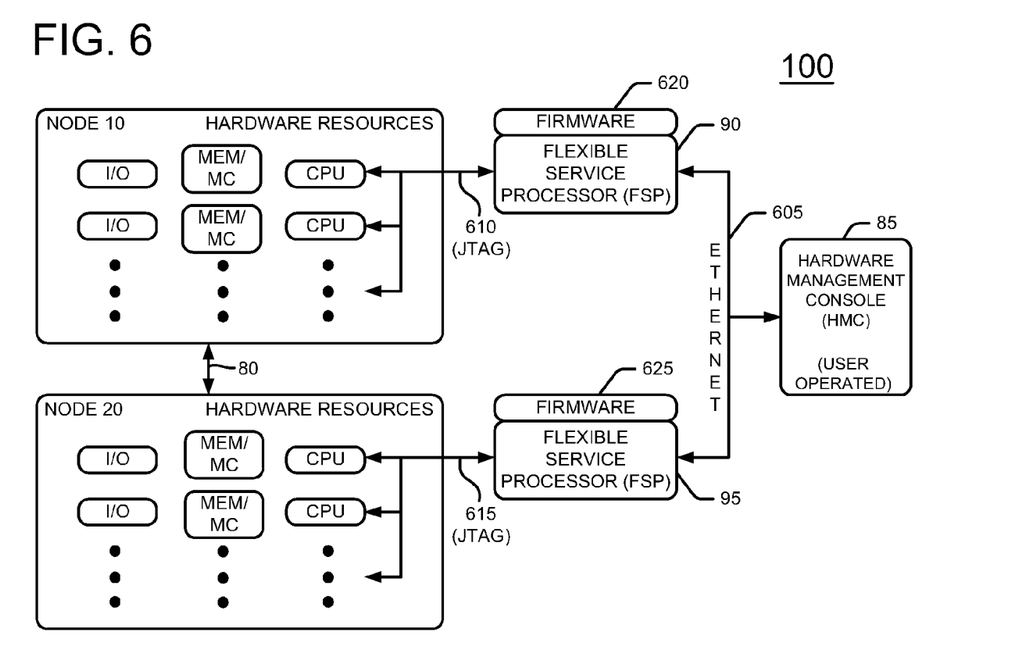
FIG. 6 is shows the disclosed IHS with flexible service processors and a hardware management console.

FIG. 6 shows a simplified representation of IHS 100 prior to the merger of node 10 of partition 1 and node 20 of partition 2. In this pre-merger state, nodes 10 and 20 run essentially as standalone machines. HMC 85 couples to the hardware resources of node 10 via flexible service processor (FSP) 90. HMC 85 also couples to the hardware resources of node 20 via flexible service processor (FSP) 95. An Ethernet network 605 may couple HMC 85 to FSPs 90 and 95. In one embodiment, FSP 90 couples to the CPUs of node 10 via a Joint Test Action Group (JTAG) interface 610. FSP 95 couples to the CPUs of node 20 via JTAG interface 615. Flexible service processors (FSPs) 90 and 95 employ firmware layers 620 and 625 to control their respective operations.

FSP 90 instructs node 10 to perform a boot sequence upon command from HMC 85. The boot sequence includes starting clocks, initializing modes, configuring hardware, loading a hypervisor, loading operating systems and starting instruction execution. FSP 95 likewise instructs node 20 to perform a boot sequence. In one embodiment, the boot sequence includes setting up the address ranges of memory controllers (MC) respectively associated with each of the memories (MEM) of a node. FIG. 6 shows a memory controller (MC) with its respective memory (MEM) as MEM/MC. Referring to node FIG. 1, although not specifically shown, IHS 100 may include a memory controller between each CPU and its CPU's memory. For example, IHS 100 may include a memory controller between CPU 21A and memory 21B, a memory controller between CPU 22A and memory 22B, a memory controller between CPU 23A and memory 23B, and so forth for the remaining CPUs and memories of IHS 100.

Referring to both FIG. 1 and FIG. 6, FSP 90 configures or instructs the memory controllers in node 10 to be responsive to requests in the address ranges that the address map of FIG. 3 indicates for the CPUs of node 10. For example, the memory controller for the CPU that associates with memory 21B responds to the address range 0-1 GB. The memory controller for the CPU that associates with memory 22B responds to the address range 1-2 GB. The memory controller for the CPU that associates with memory 23B responds to the address range 2-3 GB. The memory controller for the CPU that associates with memory 24B responds to the address range 3-4 GB.

FSP 95 configures or instructs the memory controllers in node 20 to be responsive to requests in the address ranges that the address map of FIG. 3 indicates for the CPUs of node 20. FSP 90 configures the memory controllers in node 20 such that the address ranges of the memories/memory controllers of node 20 do not overlap the address ranges of the memories/memory controllers of node 10. For example, the memory controller for the CPU that associates with memory 51B responds to the address range 4-5 GB. The memory controller for the CPU that associates with memory 52B responds to the address range 5-6 GB. The memory controller for the CPU that associates with memory 53B responds to the address range 6-7 GB. The memory controller for the CPU that associates with memory 54B responds to the address range 7-8 GB.

Figure 7:
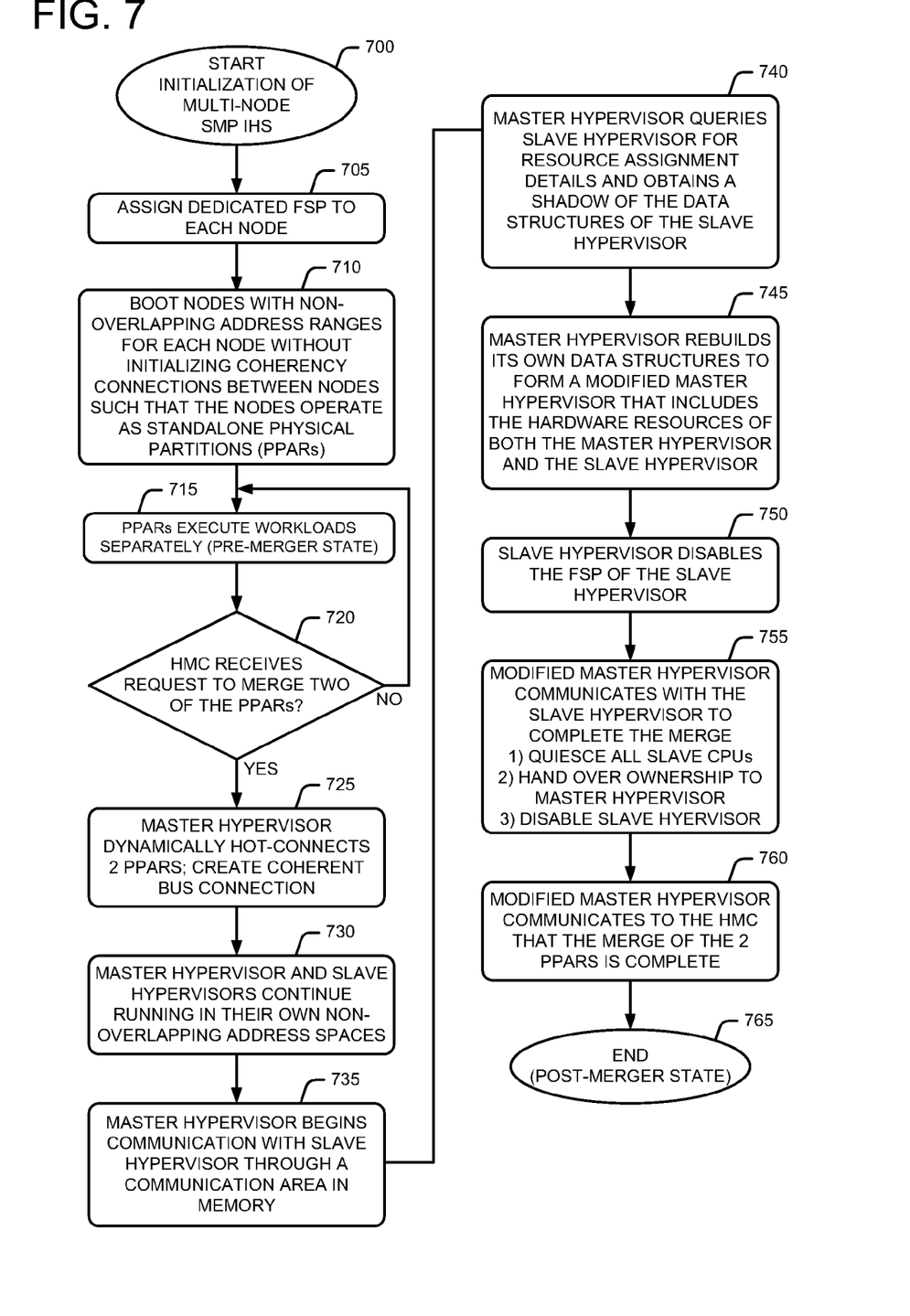
FIG. 7 is a flowchart that depicts one embodiment of the methodology that the disclosed IHS employs to dynamically merge physical partitions.

FIG. 7 is a flowchart that describes one embodiment of the method that IHS 100 employs to merge a node of one physical partition with a node of another physical partition. A user may start the process of initializing IHS 100 as a multi-node symmetric multiprocessor (SMP) system by inputting a start initialization command at HMC 85, as per block 700. HMC 85 assigns a primary flexible service processor (FSP) to each node, as per block 705. Each physical partition employs a respective FSP. In the present example, HMC 85 assigns FSP 90 to node 10 and FSP 95 to node 20.

FSP 90 boots node 10 to initialize the CPUs of node 10 to form a physical partition (PPAR) 1 that exhibits the configuration shown in FIG. 2, as per block 710. Hypervisor 35 loads and sets up multiple logical partitions (LPARs) such as logical partition 201 and logical partition 202. Hypervisor 35 assigns hardware resources (CPUs, MEMs and I/O) to logical partitions 201 and 202 in response to commands from HMC 85. Operating systems load on logical partition 201 and logical partition 202. The data structures 37 within hypervisor 35 specify the particular hardware resources of node 10 assigned to each logical partition 201 and 202. Hypervisor 35 may create more logical partitions than shown in the example of FIG. 2. In this manner, IHS 100 forms physical partition 1. In a similar manner, hypervisor 65 assigns hardware resources (CPUs, MEMs and I/O) to logical partitions 211 and 212 in response to commands from HMC 85. Operating systems load on logical partition 211 and logical partition 212. The data structures 67 within hypervisor 65 specify the particular hardware resources of node 20 assigned to each logical partition 211 and 212. Hypervisor 65 may create more logical partitions than shown in the example of FIG. 2. In this manner, IHS 100 forms physical partition 2. The respective machines that physical partition 1 and physical partition 2 form operate as separate, stand-alone machines prior to partition merger. Before partition merger, coherency bus 80 remains in the disabled state such that physical partition 1 and physical partition 2 are effectively physically separate and unconnected. Physical partition 1 and physical partition 2 execute respective workloads separately, as per block 715. In other words, physical partition (PPAR) 1 executes one application software workload and physical partition (PPAR) 2 executes another application software workload with neither partition using the hardware resources of the other prior to partition merger.

Hardware management console (HMC) monitors for a request or command to merge node 10 of physical partition 1 and node 20 of physical partition 2, as per decision block 720. One reason why a user of HMC 85 may request a merger of the two nodes is to add hardware resources from one node to a logical partition of the other node. This may enable that logical partition to handle a larger workload. If HMC 85 does not receive a request to merge physical partitions 1 and 2, then physical partitions 1 and 2 continue executing separate workloads, as per block 715. However, if HMC 85 receives a request to merge physical partitions 1 and 2, then master hypervisor 35 dynamically hot plugs or hot connects node 10 of physical partition 1 and node 20 of physical partition 2 together via coherency bus 80, as per block 725. In response to the request to merge, IHS 100 enables the formerly disabled coherent bus 80. This creates a coherent bus connection between the previously separate nodes 10 and 20. A coherent bus is one in which all bus masters snoop the requests of all other bus masters such that data are modified in a coherent fashion between multiple caches of memory in the SMP computer. As discussed above, hypervisor 35 is a master hypervisor and hypervisor 65 is a slave hypervisor. The above actions effectively connect coherency bus 80 between nodes 10 and 20. Both nodes 10 and 20 may now observe transactions on coherency bus 80. However, both master hypervisor 35 and slave hypervisor 65 are still active. The flowchart of FIG. 8, discussed below, provides more detail with respect to one method for hot plugging node 20 into node 10 via coherency bus 80. Node 10 may observe memory transactions of node 20 via the now enabled coherency bus 80. Likewise, node 20 may observe memory transactions of node 10 via coherency bus 80. No conflicts occur when one node observes the other node's memory transactions because node 10 and a node 20 each employ respective non-overlapping memory regions as seen in FIG. 3.

The master hypervisor 35 of node 10 and the slave hypervisor 65 of node 20 continue to execute or run in their own respective non-overlapping address spaces, as per block 730. As shown in the pre-merger address map of FIG. 3, master hypervisor 35 executes in the address space of node 10, for example in the first 256 KB of memory 21B in one embodiment. Master hypervisor 35 begins communication with slave hypervisor 65 via a communication region 310 at a predetermined absolute address location in one of the memories of node 10, such as memory 21B, as per block 735. For example, communication region 300 may occupy the second 256 KB of memory 21B. At this point, HMC 85 can still communicate with both master hypervisor 35 and slave hypervisor 65. HMC 85 may query master hypervisor 35 to determine the address range for region 310 and then communicate that address range to the slave hypervisor 65. In this manner, master hypervisor 35 of node 10 and slave hypervisor 65 of node 20 both know the location of communication region 310.

Master hypervisor 35 queries slave hypervisor 65 via communication region 310 to access and retrieve a shadow copy of the hardware resource allocation data structures 67 of node 2, as per block 740. Slave hypervisor 65 transmits the shadow copy of hardware resource data structures 67 back to master hypervisor 35 via coherency bus 80. After receiving the shadow copy of hardware resource data structures 67, master hypervisor 35 rebuilds its own data structures 37 to include not only the existing hardware resource allocations of data structures 37 of node 10 but also the hardware resource allocation data structures 67 from node 20, as per block 745. The resultant modified master hypervisor 35' includes the hardware resource data structures of node 10 and the hardware resource data structures of node 20.

Slave hypervisor 65 communicates with its flexible service processor (FSP) to terminate communication with HMC 85, as per block 750. Modified master hypervisor 35' uses communication region 310 to communicate with slave hypervisor 65 to complete the merger. As part of completing the merger, slave hypervisor 65 momentarily quiesces the CPUs that associate with it, namely CPUs 51A, 52A, 53A and 54A, as per block 755. Slave hypervisor 65 hands over ownership of the hardware resources formerly associated with node 20 of partition 2 to master hypervisor 35 of node 10 of partition 1, also as per block 755. With the merger complete, modified master hypervisor 35' communicates to HMC 85 that merger of node 10 of physical partition 1 and node 20 of physical partition 2 is complete, as per block 760. The partition merger ends at end block 765. Applications associated with node 10 and applications formerly associated with node 20 continue to execute on their respective operating systems after the partition merger. The merged memory space continues to look like the memory map of FIG. 3, except that slave hypervisor 65 is effectively no longer present and master hypervisor 35 becomes modified master hypervisor 35'.

In this particular example, prior to the merger, physical partition 1 included 4 CPUs, 4 memories (MEM) and 4 I/O adapters in node 10, as shown in FIG. 2. Master hypervisor 35 controlled those CPU, memory and I/O hardware resources.

Prior to the merger, physical partition 2 included 4 CPUs, 4 memories (MEM) and 4 I/O adapters in node 10, as shown in FIG. 2. Slave hypervisor 65 controlled those CPU, memory and I/O hardware resources. However, after physical partition merger, IHS 100' forms a merged physical partition 400 in which modified master hypervisor 35' controls the allocation of all 8 CPU, memory and I/O hardware resources, as shown in FIG. 4. Modified master hypervisor 35' may allocate any of these hardware resources originally from nodes 10 and 20 to any of the logical partitions, such as logical partitions 201, 202, 211 and 212, as well as other logical partitions.

Figure 8:
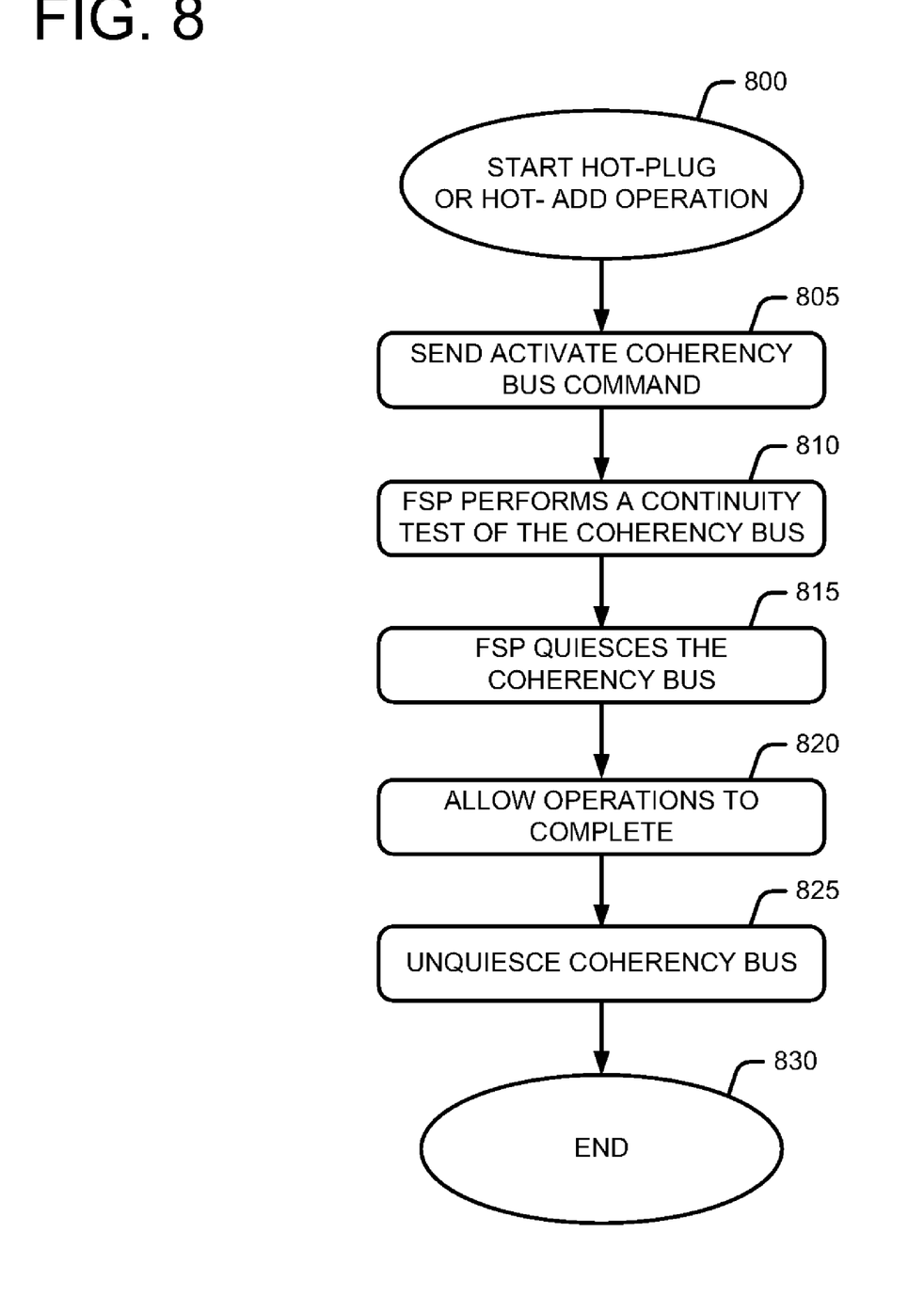
FIG. 8 is a flowchart of the hot-adding or hot-plugging portion of the flowchart of FIG. 7.

FIG. 8 is a high-level flowchart that shows steps of a hot plugging or hot-adding operation wherein IHS 100, under the direction of HMC 85, hot-plugs or hot-adds node 20 to node 10 via coherency bus 80. The hot-plug operation starts at block 800. A user at hardware management console (HMC) 85 sends an activate coherency bus command to coherency bus 80 via a flexible service processor (FSP), such as FSP 90 for example, as per block 805. FSP 90 performs a continuity test on coherency bus 80, as per block 810. If the coherency bus 80 fails the continuity test, then the hot-plug operation terminates. If the coherency bus 80 passes the continuity test, then the hot plug operation continues. In response to passing the continuity test, FSP 90 quiesces coherency bus 80, as per block 815. FSP 90 then waits and allows pending node 10 and 20 operations to complete, as per block 820. When pending operations complete, FSP 90 unquiesces coherency bus 80, as per block 825. The hot-plug operation ends at end block 830.

As seen in the flowchart of FIG. 7, IHS 100 may operate in either the pre-merger or the post-merger state. In the pre-merger state, node 10 of physical partition 1 and node 20 of physical partition 2 are physically separate with each node executing a different application software workload. Even though node 10 of physical partition 1 and node 20 of physical partition 2 are separate or unmerged, each node may employ a respective memory address range that does not overlap the address range of the other node. In this manner, nodes 10 and 20 are ready for a merger operation even if a user never requests a merger operation at decision block 720. However, should the user at HMC 85 request a merger of nodes 10 and 20, IHS 100 enables coherency bus 80 to connect nodes 10 and 20. Each node continues using its respective predetermined address range that does not overlap the address range of the other. IHS 100' may thus avoid addressing conflicts in the post-merger state. In one embodiment, the merger of the first and second partitions is dynamic because the user need not power down both of the partitions to conduct the merger operation. The user instead may use HMC 85 to send an enable command that logically enables coherency bus 80 to hot plug or hot connect node 10 of partition 1 to node 20 of partition 2 to form a merged physical partition. The modified master hypervisor 35' of the merged partition 400 allows a logical partition to access hardware resources from either node 10 or node 20 in the merged partition as long as those hardware resources are available.

While FIG. 1 shows one form of IHS 100, IHS 100 may take many forms such as of a desktop, server, portable, laptop, notebook, or other form factor computer or data processing system. IHS 100 may take still other form factors such as a gaming device, a personal digital assistant (PDA), a portable telephone device, a communication device or other devices that include a processor and memory.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

providing first and second nodes that are physically partitioned from one another, the first and second nodes being in a pre-merger state;

configuring the first node to operate in a first predetermined address range while the first node exhibits the pre-merger state;

configuring the second node to operate in a second predetermined address range that is non-overlapping with respect to the first predetermined address range while the second node exhibits the pre-merger state; and activating, in response to a merge command, a communication bus between the first and second nodes to merge the first and second nodes to form a merged physical partition in a post-merger state, wherein the first node communicates over the communication bus with the second node via the second predetermined address range of the second node, and further wherein the second node is capable of communicating over the communication bus with the first node via the first predetermined address range of the first node;

wherein the first node includes first hardware resources and a first logical partition, wherein the second node includes second hardware resources and a second logical partition, the first and second hardware resources being within the merged physical partition, wherein the first hardware resources include a first memory, the method further comprising configuring the first memory to operate in the first predetermined address range;

wherein the second hardware resources include a second memory, the method further comprising configuring the second memory to operate in the second predetermined address range that is not overlapping with respect to the first predetermined address range;

configuring a master hypervisor on the first node and a slave hypervisor on the second node during the pre-merger state;

storing first hardware resource data structures of the first node in the master hypervisor and storing second hardware resource data structures of the second node in the slave hypervisor;

transmitting, by the second node, the second hardware resource data structures to the first node; and configuring a modified master hypervisor to include the first hardware resource data structures and the second hardware resource data structures.

2. The method of claim 1, wherein the first node includes first hardware resources and a first logical partition, wherein the second node includes second hardware resources and a second logical partition, the first and second hardware resources being within the merged physical partition, the method further comprising accessing by the first logical partition the second hardware resources in the merged partition.

3. The method of claim 2, further comprising accessing by the second logical partition the first hardware resources in the merged partition.

4. The method of claim 1, further comprising disabling the slave hypervisor in the post-merger state.

5. The method of claim 1, wherein the first hardware resources include a plurality of CPUs, a plurality of memories and a plurality of I/O adapters, wherein the second hardware resources include a plurality of CPUs, a plurality of memories and a plurality of I/O adapters, the method further comprising accessing, by one of the plurality of CPUs in the first hardware resources during the post-merger state, one of the second hardware resources.

6. An information handling system (IHS) comprising:

first and second nodes that are physically partitioned from one another, the first and second nodes being in a pre-merger state, wherein the first node is operative in a first predetermined address range and the second node is operative in a second predetermined address range that is non-overlapping with respect to the first predetermined address range; and a communication bus situated between the first and second nodes, the communication bus being logically disabled during the pre-merger state, the communication bus responding to a merge command to merge the first and second nodes to form a merged physical partition in a post-merger state wherein the first node is capable of communicating over the communication bus with the second node via the second predetermined address range of the second node, and further wherein the second node communicates over the communication bus with the first node via the first predetermined address range of the first node;

wherein the first node includes first hardware resources and a first logical partition, wherein the second node includes second hardware resources and a second logical partition, the first and second hardware resources being within the merged physical partition, such that the first logical partition accesses the second hardware resources in the merged partition;

wherein the first hardware resources include a first memory that is configured to operate in the first predetermined address range;

wherein the second hardware resources include a second memory that is configured to operate in the second predetermined address range that is not overlapping with respect to the first predetermined address range;

wherein the first node includes a master hypervisor during the pre-merger state and the second node includes a slave hypervisor during the pre-merger state;

wherein the master hypervisor includes first hardware resource data structures of the first node and the slave hypervisor includes second hardware resource data structures of the second node;

wherein the second node is configured to transmit the second hardware resource data structures to the first node; and the system further comprising a modified master hypervisor that includes the first hardware resource data structures and the second hardware resource data structures.

7. The IHS of claim 6, wherein the first node includes first hardware resources and a first logical partition, wherein the second node includes second hardware resources and a second logical partition, the first and second hardware resources being within the merged physical partition, such that the second logical partition accesses the first hardware resources in the merged partition.

8. The IHS of claim 6, wherein the modified master hypervisor is configured to disable the slave hypervisor in the post-merger state.

9. The IHS of claim 6, wherein the first hardware resources include a plurality of CPUs, a plurality of memories and a plurality of I/O adapters, wherein the second hardware resources include a plurality of CPUs, a plurality of memories and a plurality of I/O adapters, wherein one of the plurality of CPUs in the first hardware resources accesses one of the second hardware resources during the post-merger state.

* * * * *